United States Patent [19]
Turchetti

[11] Patent Number: 5,904,858
[45] Date of Patent: May 18, 1999

[54] FILTER WITH TURBULENCE GENERATING TURBINE AND SEPARATION METHOD

[76] Inventor: Attilio Turchetti, Rodovia BR-060, s/no-Kms 213/233, Goiania (Goias), Brazil

[21] Appl. No.: 08/893,698

[22] Filed: Jul. 11, 1997

[51] Int. Cl.⁶ .................................................. B01D 11/02
[52] U.S. Cl. .................. 210/767; 210/209; 210/211; 210/405; 210/413; 210/773; 210/414; 210/415; 210/781; 210/787; 426/489; 426/490; 426/495
[58] Field of Search .................. 494/36, 53, 60; 210/405, 413, 414, 415, 773, 781, 767, 787, 209, 211; 100/117; 426/489, 490, 495

[56] References Cited

U.S. PATENT DOCUMENTS

| | | | |
|---|---|---|---|
| 1,940,585 | 12/1933 | Fauth | 422/271 |
| 4,363,264 | 12/1982 | Lang et al. | 99/510 |
| 4,617,177 | 10/1986 | Schumacher | 422/273 |
| 4,873,095 | 10/1989 | Rundle | 426/50 |
| 5,160,441 | 11/1992 | Lundquist | 210/781 |
| 5,338,451 | 8/1994 | Lindberg et al. | 210/405 |

FOREIGN PATENT DOCUMENTS 1187268   4/1970   United Kingdom .

*Primary Examiner*—Jay H. Woo
*Assistant Examiner*—Fred Prince
*Attorney, Agent, or Firm*—Herbert Dubno

[57] ABSTRACT

A filter for separation of a liquid from a solid has a turbine surrounded by an elongated filter body and forms a short first stage with short-pitch blades, providing a high axial impulse and low radial impulse, followed by a long second stage with long-pitch blades providing primarily radial displacement. Water vapor can be injected to promote juice extraction and is fed axially into the shaft and emerges from outlets therealong.

7 Claims, 4 Drawing Sheets

5,904,858

FILTER WITH TURBULENCE GENERATING TURBINE AND SEPARATION METHOD

FIELD OF THE INVENTION

The present invention relates to a turbine generator for producing a controlled turbulence of solids suspended in a liquid and to a process for separation performed with a filter provided with such a turbine. The invention relates particularly to the filtering of juices of citric fruits to improve the simultaneous filtering and extraction of pulp juice (brix).

BACKGROUND OF THE INVENTION

Normally, the pulp resulting from the preparation processes performed with usual separator filters still comprise soluble solid material (brix), that constitutes a significant part of the product. The separation of this soluble solid material from insoluble solid material is presently carried out by means of specific equipment placed ahead of the filter in the processing line. This extraction of the soluble solids is not completely suitable since it makes the process complex and it is necessary to provide specific equipment and means for circulation of the pulp form the filters to the specific equipment. In addition the processing is more complex.

Besides the technical complexity it also deserves being emphasized that this processing of the juice is more expensive as a whole.

OBJECTS OF THE INVENTION

It is an object of the invention to provide an improved turbine generator of controlled turbulence for solids suspended in the liquid of separator filter and an improved separation process performed with a separator filter that permit all soluble solids of the product that enters the filter to be extracted, thereby avoiding the need for specific procedures for extraction of the juice in addition to the filtering and the drawbacks caused by them.

Another object is to improve the turbine to optimize the performance thereof.

BRIEF DESCRIPTION OF THE DRAWING

The drawing attached hereto depicts the improvements to a turbine generator of controlled turbulence for solids suspended in the liquid of a separator filter in accordance with the invention. IN the drawing.

SPECIFIC DESCRIPTION

Figure 1:
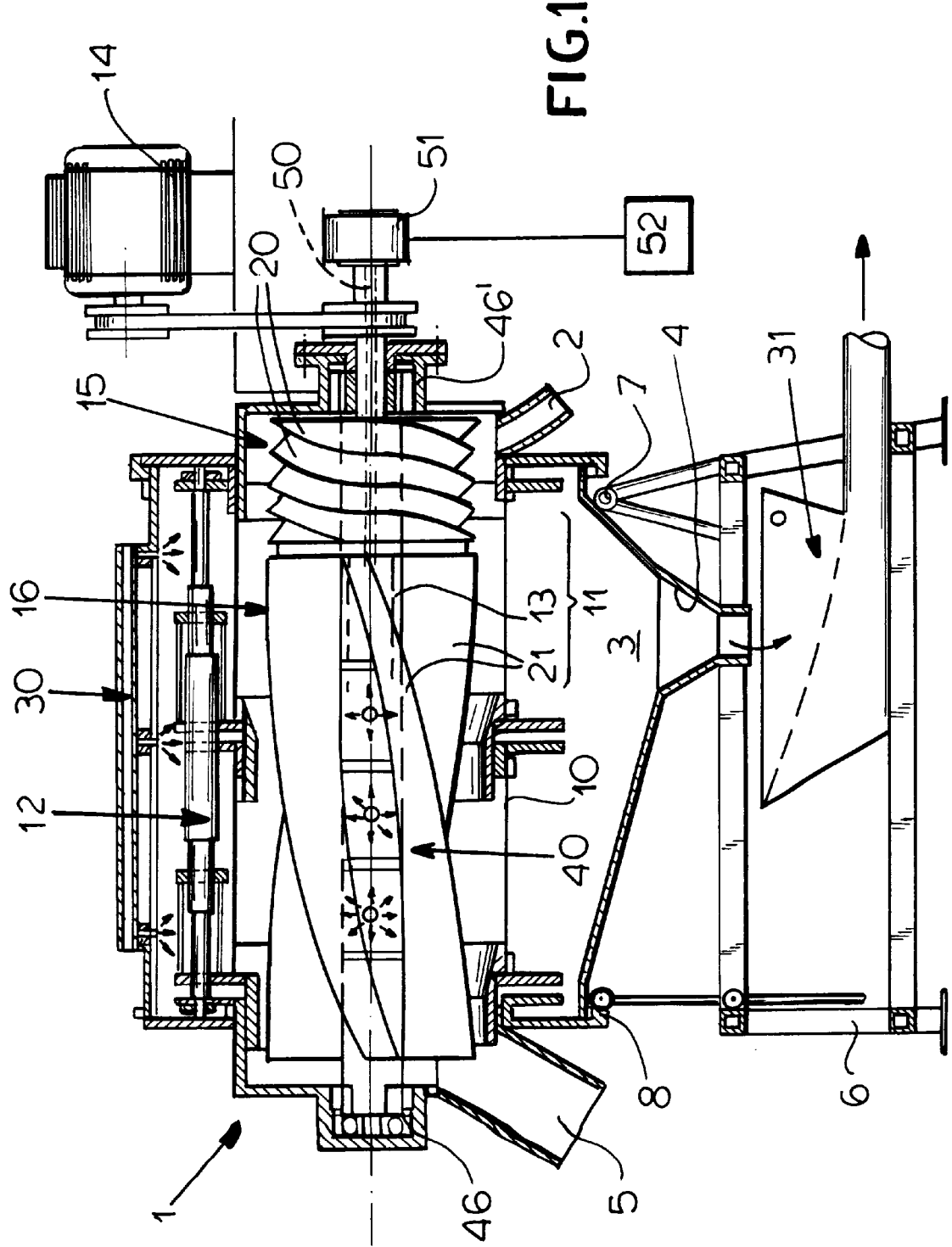
FIG. 1 is a longitudinal section of a separator filter, the turbine being made part thereof.

In the apparatus shown in the drawing in accordance with the above Figures, the turbine, which is the subject of the present invention, is part of a separator filter (FIG. 1), which is the subject of other applications for patent filed by the same applicant, the filter is substantially comprised by a tilting filter body or housing 1, an end of which is provided with an entrance or inlet 2 for feeding of the product to be filtered. Intermediate of the body housing (i.e. midway therealong), there is a filtering element 3 which is provided with a lower exit or outlet 4 for the filtrate. At the opposite end of the filter body there is provided an exit or outlet 5 for the solids. The tilting filter body 1 is mounted on a support 6 by means of joints 7 positioned on its entrance end and a device 8 for control of tilting positioned at its solid exit end 5, which permits regulation of the tilting of the tilting filter body 1 in such a way that, for instance, the solids outlet 5 may be positioned above the suspension outlet 2 in order to permit gravity to also act in the filtering process, in accordance with the characteristics of the product to be filtered and desired final filtered.

The filtering element 3 is formed by a filtering sleeve 10 that operates together with a turbine 11. The filtering sleeve 10 is mounted on filter body 1 by means of resilient supports and the inlet end of the sleeve 10 is placed next to the inlet 2 of filter body 1. The sleeve 10 houses part of the blade turbine 11. The other end of the filtering sleeve 10 is located close to the solids outlet 5.

The blade turbine 11 is formed by a shaft assembly 13 that is driven by a motor set 14 externally of filter body 1. Around the shaft 13 are mounted radial blades in such a way as to define two stages to the turbine. One stage is an entrance stage 15 positioned close to inlet 2 of filter body 1 and sleeve 10 and formed by blades 20 with the shape of a short pitch propeller that provides an axial impulse (thrust) and no radial impulse to the liquid to be filtered. The other stage is a processing stage 16 housed inside sleeve 10 and formed by blades 21 (FIG. 3) with the shape of a long pitch propeller that provide a great radial and a small axial impulse to the liquid and that have a convex surface 22 (i.e. a curvature in radial section) for traction of the liquid to provide an impulse to the material to be filtered, which is the resultant of tangential components to the convex surface. The short pitch entrance helical blades 20 and long pitch processing blades 21 are placed in such a way that they generate a system of forces on the liquid to be filtered in order to move the liquid in a vortex along all the extension of filtering sleeve 10 that becomes wider from the entrance end to the outlet thereof in order to provide a washing self-cleaning effect to filtering sleeve 10.

Completing the filter is a counter washing device 30 and a safety device 31 against damage to the filtering element which are subjects of other applications for patent filed by the same applicant.

Figure 2:
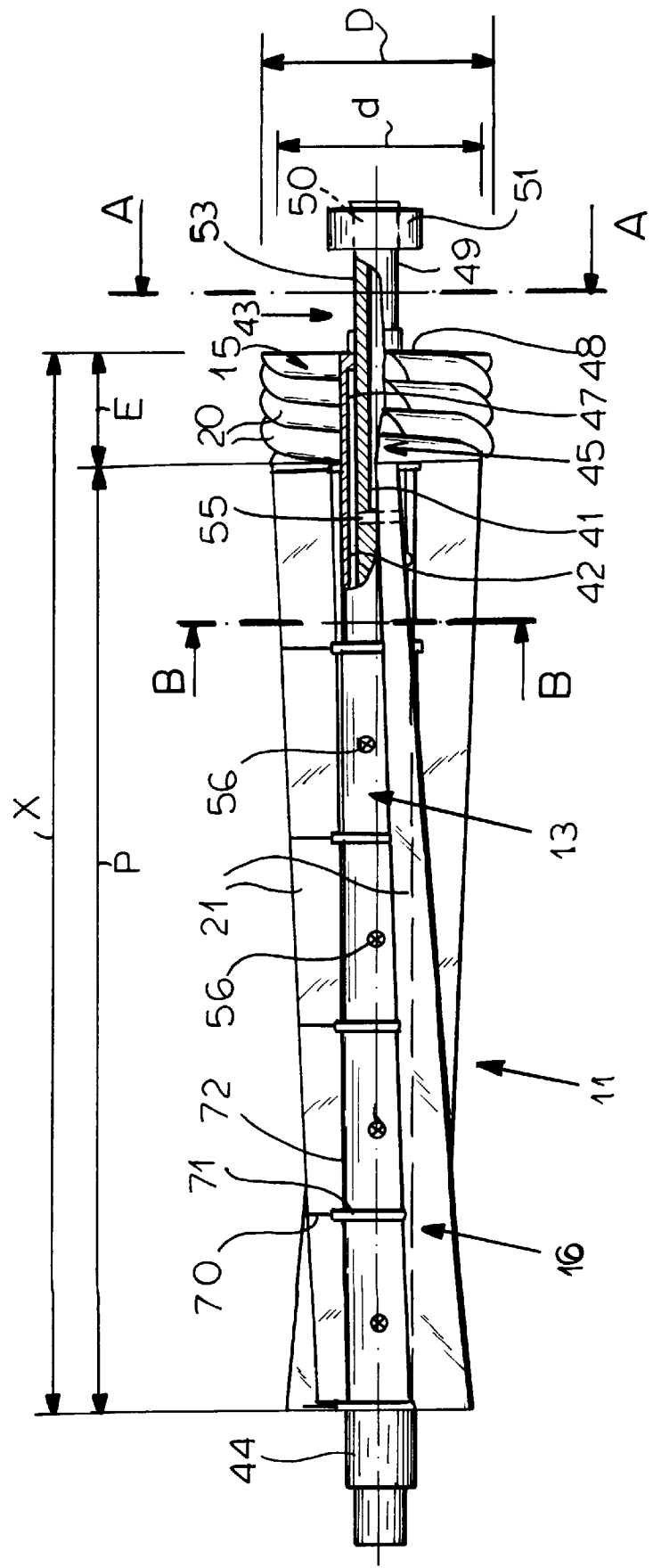
FIG. 2 shows a detail of the turbine according to the present invention.

The present improvements consist firstly in providing turbine 11 (FIGS. 2 and 3) with a fluid separator device 40 for the separation of part of soluble solids from insoluble solids of product vortex and the separation of pulp juice (brix), substantially formed by a hydraulic circuit in the shaft set 13 that injects and vaporizes water under pressure in a radial direction from the shaft set 13 to filtering sleeve 10 in such a way that the water vaporized under pressure passes, from inside to outside, through the vortex of the product generated by the processing stage 16 of shaft set 13 and goes through the pulp positioned close to an inner side of sleeve 10 thus separating part of soluble solids from insoluble solids of product vortex and the pulp juice (brix), simultaneously with the mechanical filtering process provided by the turbine 11 and sleeve 10 acting jointly.

Figure 3:
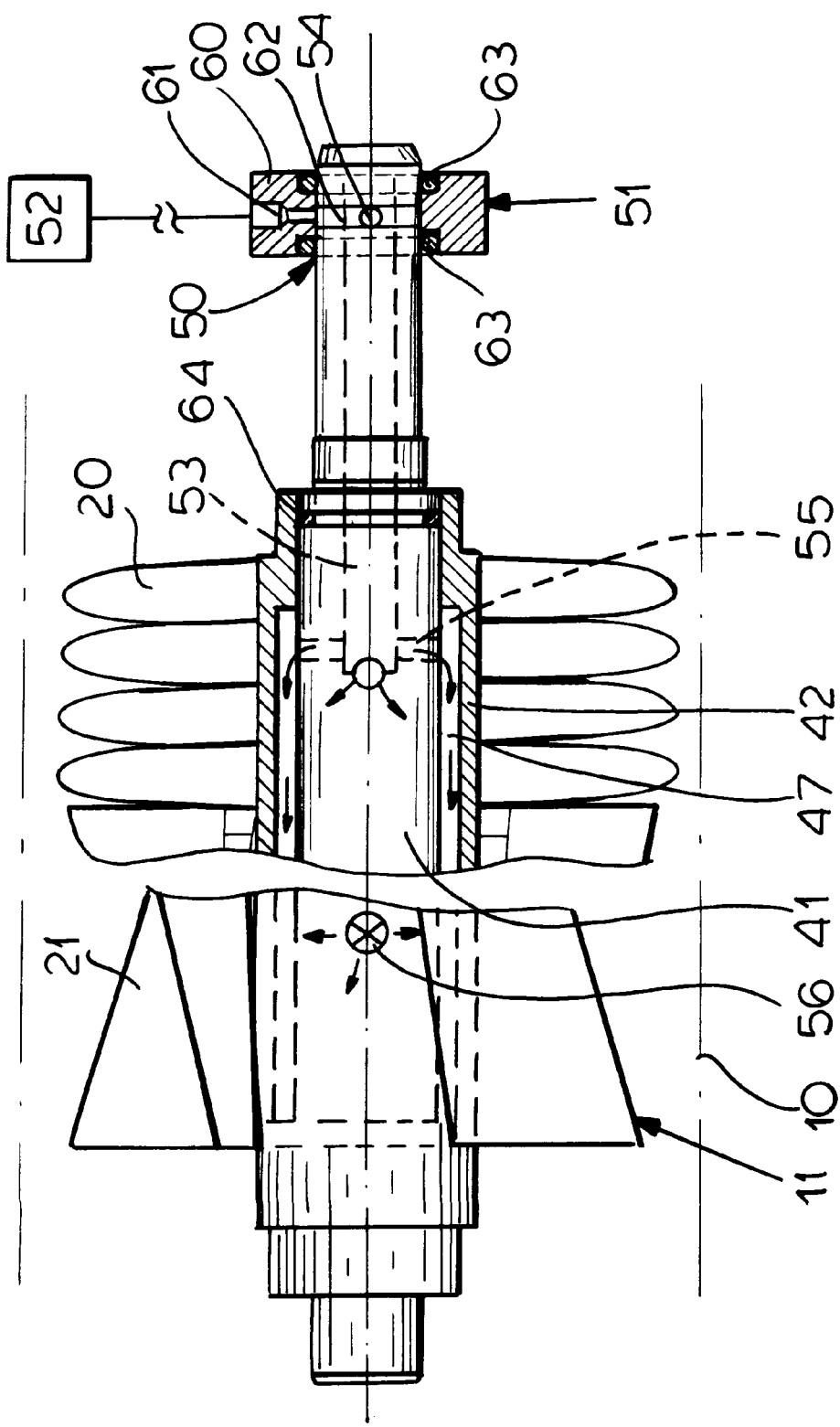
FIG. 3 is a partial cross section of a turbine detail, showing the device for separation of soluble solids from insoluble solids, according to the present invention.

Preferably, as depicted in FIG. 3, the shaft set 13 embodying the hydraulic circuit is formed by a massive central shaft 41 and by an external tubular shaft 42 rigid with one another. The external tubular shaft 42 has helical blades of short pitch 20 and of long pitch 21 mounted thereon.

The central shaft 41 is provided with a first end 43 and a second end 44 extending out of external tubular shaft 42 and an intermediate portion 45 internally thereto. The first end 43 is next to the solids outlet from filter body 1 and is provided with a base to support a bearing 46 placed at this end of filter body.

Between the intermediate portion 45 of the massive central shaft 41 and the external tubular shaft 42 there is defined an annular space 47 which is part of the hydraulic circuit for circulation of water under pressure and the second end 44 of the massive shaft 41 provided with a base 48 to support a bearing 46. A seat 49 for a driving pulley (not illustrated) and a hydraulic connection joint 51, which is made part of a hydraulic circuit embodied to shaft set 13, are also provided of this end of shaft 41.

The hydraulic circuit (FIG. 3) of shaft set 13 and that forms the fluid separator device 40 from pulp juice (brix) is substantially formed by: the hydraulic connection joint 51 coupled to the free end 50 of massive central shaft 41 and connected to a hydraulic circuit 52 for the feeding of water under pressure; by an axial duct 53 extended in the shaft 41 from the free end 50 radial ducts 54 between the hydraulic connection 51 and duct 53; and radial ducts 55 connecting the duct 53 with annular space 47 between the central massive shaft 41 and the tubular external shaft 42. The annular space 47 has radial injector nipples 56 positioned at external tubular shaft regions 42 between the long pitch processing blades 21 thereof.

Accordingly, this hydraulic circuit injects and vaporizes water under pressure in a radial direction through, from inside to outside, the vortex of the product formed inside sleeve 10 by the turbine 11 and the pulp of the product along the sleeve 10.

The hydraulic connection joint 51 is an annular body 60 enough to close-fitting the end 50 of central massive shaft 41 provided with a radial inlet 61 connected to the feeding circuit 52 for pressurized water and that is aligned with an annular groove 62 on the end of shaft 50 and at the bottom of which the radial ducts 54 open. Laterally of the annular groove 62 are positioned sets of o' ring sealing rings 63 and on the ends of annular space 47 defined between shafts 41, 42 are other sets of o' ring sealing rings 64.

Turbine 11 has an effective length "X", the entrance stage 15 has a length "H" corresponding to about a little more than one tenth "X" and the processing stage 16 has a length "P" corresponding to about a little less than 9 tenths of the effective length "X" of turbine 11.

The entrance stage 16 is formed by at least four short pitch helical blades 20, each one developed around and along all perimeter of the portion comprising the external tubular shaft 42 corresponding to the entrance step 15 of the turbine, regularly spaced in relation to each other. The free edges of blades 23 define an external diameter "D" for entrance stage 15 corresponding to about a little more than one fifth of effective length "X" of turbine 11.

Figure 5:
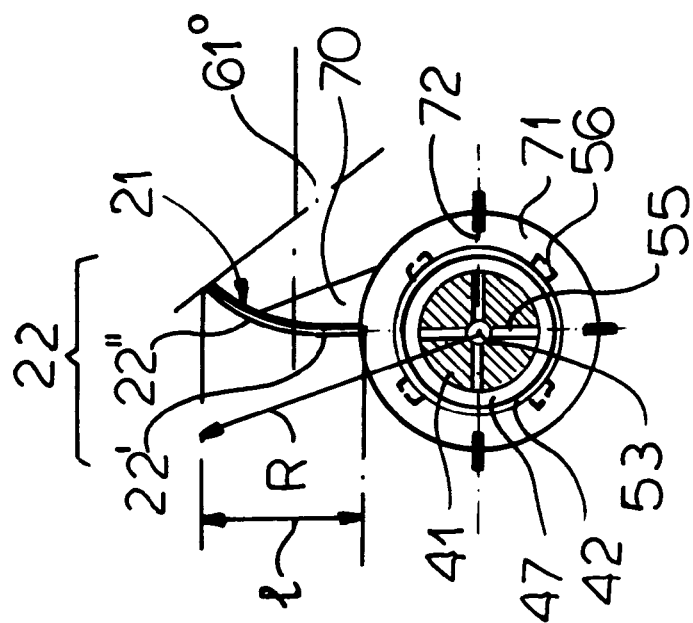
FIG. 5 is a cross-sectional view along line B—B of the turbine wherein is depicted a schematic detail of the turbine processing step.
Figure 4:
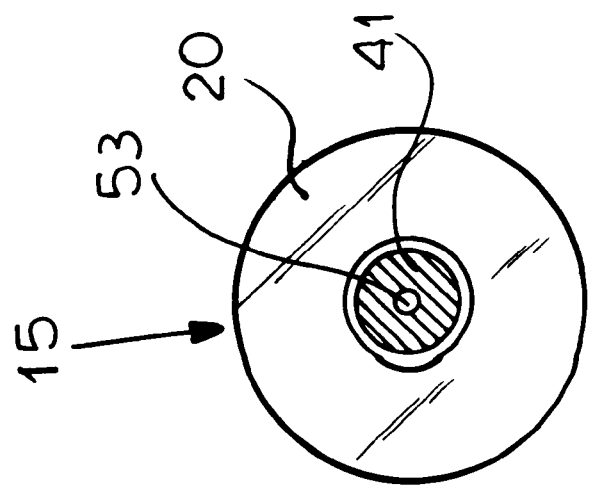
FIG. 4 is a cross-sectional view along line A—A of the turbine wherein is depicted a schematic detail of the turbine entrance step.

The processing stage 16 is formed by at least four long pitch helical blades 21, each extending around and along one fourth of the perimeter of external tubular shaft portion 42, the blade being regularly spaced with relation to each other. The free edges of these blades define a diameter "d" for processing stage 16 a little less than the external diameter "D" defined by blades 20 for the entrance stage 15. Each long pitch helical wing 21 of processing stage 16 (FIG. 5) has a width "I" corresponding to about two thirds of total radius "R" (width "I" of blade+radius of shaft set 13) of the processing stage 16 and the surface 22 for traction of the liquid from the processing helical wing 21 (FIG. 5) is convex. Blade 21 is thus provided with a section comprised by a radial straight inner portion 22' and a curved outer portion 22", this one provided with a curvature radius "r" with a length corresponding to about a little more than half of width "I" of the blade and an extension of about 60° and the radial straight internal portion 22' has a length corresponding to a little less than half of width "I" of the blade 21 (see FIG. 5).

The processing blades 21 have concave surfaces opposite to convex traction surfaces 22 supported on radial blades 70, and these and the processing blades 21 are supported on positioner/spacer rings 71 mounted around the external tubular shaft 42 of shaft set 13 in such a way that between the external surface of the external tubular shaft 42 and the internal edges of processing blades 21 there are defined spaces 72 for absorption of pressure peaks generated in the liquid to be filtered during turbine driving.

I claim:

1. A separation filter comprising:

an elongated filter body having an inlet for a suspension at one end and an outlet for solids at an opposite end;

means for collecting filtrate from around said filter body between said ends;

a turbine in said filter body and comprising:

a shaft extending through said filter body and connected externally of said filter body with a drive, a set of short-pitch turbine blades on said shaft at said one end for generating a substantial axial impulse and little radial impulse in said suspension in a short first stage of said turbine, and a set of long-pitch turbine blades on said shaft extending from said set of short-pitch turbine blades over the length of said filter body to said other end for generating substantially radial displacement in said suspension in a long second stage of said turbine; and means for subjecting solids in said suspension to injected water vapor for promoting extraction of juice therefrom, said means for subjecting including:

a passage extending axially through said shaft, means coupled with said shaft for feeding water to said passage, and outlets spaced along said shaft connecting said passage to an interior of said filter body in both of said stages to inject vaporizing water into said body.

2. A filter for the separation of pulp from juice in a pulp/juice suspension comprising:

an elongated tubular filter body having an inlet end and an outlet end;

means forming a suspension inlet for said body at said inlet end and means forming a solids outlet for said body at said outlet end;

a filter housing surrounding said body between said ends and formed with a filtrate outlet;

a support for said housing enabling tilting thereof to elevate said solids outlet above said suspension inlet;

a turbine in said filter body and journaled in said housing, said turbine comprising a shaft assembly extending through said filter body, short-pitched helical blades on said shaft assembly extending over a small portion of the length thereof at said inlet end for primarily providing axial thrust to said suspension in an entrance stage, long-pitched blades extending over a major portion of the length of said shaft assembly in said filter body for imparting radial impetus to said suspension and to generate a vortex around said shaft assembly between said entrance stage and the outlet end of said body over a processing stage, and means for rotating said turbine; and means including nozzles disposed along said shaft assembly between said long-pitch blades and means for supplying water under pressure to said nozzles for injecting water under pressure into said filter body around said shaft assembly for vaporizing the injected water under pressure so that water vaporized under pressure passes from outwardly through said vortex to pulp collecting on an interior of said filter body to separate soluble solids therefrom simultaneously with a mechanical filtering provided by said turbine and said filter body.

3. The filter defined in claim 2 wherein said shaft assembly comprises a massive central inner shaft and a tubular outer shaft mounted on said inner shaft and defining from said inlet end to said outlet end of said body, an annular compartment, said outer shaft being provided with said nozzles along said processing stage between said long pitch blades, said central shaft being formed with an axial passage opening via radial bores into said compartment and communicating by radial bores externally of said housing with a hydraulic connection joint connected to a source of water under pressure, said central shaft extending axially beyond said outer shaft at opposite ends of said central shaft and being mounted in said housing by respective borings at said ends of said central shaft.

4. The filter defined in claim 3 wherein said connection joint is an annular body fitting over one of said ends of said central shaft and having a radial inlet connected to said source, an annular groove opening toward said end of said central shaft received in said body and communicating with radial bores thereof, and a pair of O ring seals flanking said groove and sealing between said body and said central shaft, additional O ring seals sealing between said outer shaft and said central shaft.

5. The filter defined in claim 3 wherein said turbine has an effective length X and said entrance stage has a length E corresponding substantially to slightly more than $\frac{1}{10}$th X, said processing stage having a length P corresponding to slightly less than $\frac{9}{10}$ X, said short pitch blades being at least four in number and being uniformly spaced around said outer shaft with outer edges of said short pitch blades defining an outer diameter D slightly greater than $\frac{1}{5}$ X, said long pitch blades each extending around $\frac{1}{4}$ of the perimeter of said outer shaft and being four in number with outer free edges defining a diameter d slightly less than said diameter D, said short pitch blades having a radial length corresponding to substantially $\frac{2}{3}$ of a radius R equal to $\frac{1}{2}$ the diameter D, said long pitch blades having straight portions adjacent to said outer shaft and being curved outwardly of said straight portions, each straight portion having a radial length slightly less than $\frac{1}{2}$ the total radial length of the respective long pitch blade.

6. The filter defined in claim 5, further comprising spaces between inner edges of said long pitch blades and said outer shaft for relieving pressing peaks upon liquid displaced by rotation of said turbine.

7. A method of operating a filter for the separation of pulp from juice in a pulp/juice suspension in which an elongated filter body has an inlet end and an outlet end and is located in a filter housing formed with a filtrate outlet and a turbine is rotated in said filter body, said method comprising the steps of separating pulp from juice by action of said turbine whereby juice passes through the filter body and pulp collects along the interior of said body;

generating by the action of said turbine in said body a vortex promoting separation of soluble solids from insoluble solids during filtering of pulp from juice; and injecting water under pressure through nozzles into said filter body from said turbine whereby said water is vaporized and vaporizing water passes through said-vortex to said pulp collecting said filter body, thereby enabling the separation of additional soluble solids from insoluble solids of said pulp.

* * * * *